United States Patent [19]
Scruggs et al.

[11] Patent Number: 5,732,187
[45] Date of Patent: Mar. 24, 1998

[54] SPEAKER-DEPENDENT SPEECH RECOGNITION USING SPEAKER INDEPENDENT MODELS

[75] Inventors: Jeffrey L. Scruggs, St. Louis, Mo.; Barbara J. Wheatley, Plano, Tex.; Abraham P. Ittycheriah, Danbury, Conn.

[73] Assignee: Texas Instruments Incorporated, Dallas, Tex.

[21] Appl. No.: 664,300

[22] Filed: Jun. 10, 1996

Related U.S. Application Data

[63] Continuation of Ser. No. 127,716, Sep. 27, 1993, abandoned.
[51] Int. Cl.$^6$ .................................................. C10L 5/00
[52] U.S. Cl. .................................................. 395/2.6
[58] Field of Search .................................. 395/2.6, 2.61

[56] References Cited

U.S. PATENT DOCUMENTS

| | | | |
|---|---|---|---|
| 5,144,672 | 9/1992 | Kuriki | 381/41 |
| 5,165,095 | 11/1992 | Borcherding | 379/88 |
| 5,222,190 | 6/1993 | Pawate et al. | 395/2 |
| 5,293,452 | 3/1994 | Picone et al. | 395/2.59 |

FOREIGN PATENT DOCUMENTS

WO 92/14237   8/1992   WIPO.

*Primary Examiner*—Allen R. MacDonald
*Assistant Examiner*—Susan Wieland
*Attorney, Agent, or Firm*—Robert L. Troike; W. James Brady, III; Richard L. Donaldson

[57] ABSTRACT

The memory and data management requirements for text independent speaker dependent recognition are drastically reduced by using a novel approach that eliminates the need for separate acoustic recognition models for each speaker. This is achieved by using speaker independent recognition models at the acoustic level. The speaker dependent data stored for each item to be recognized consists only of information needed to determine the speaker independent recognition model sequence for that item.

11 Claims, 4 Drawing Sheets

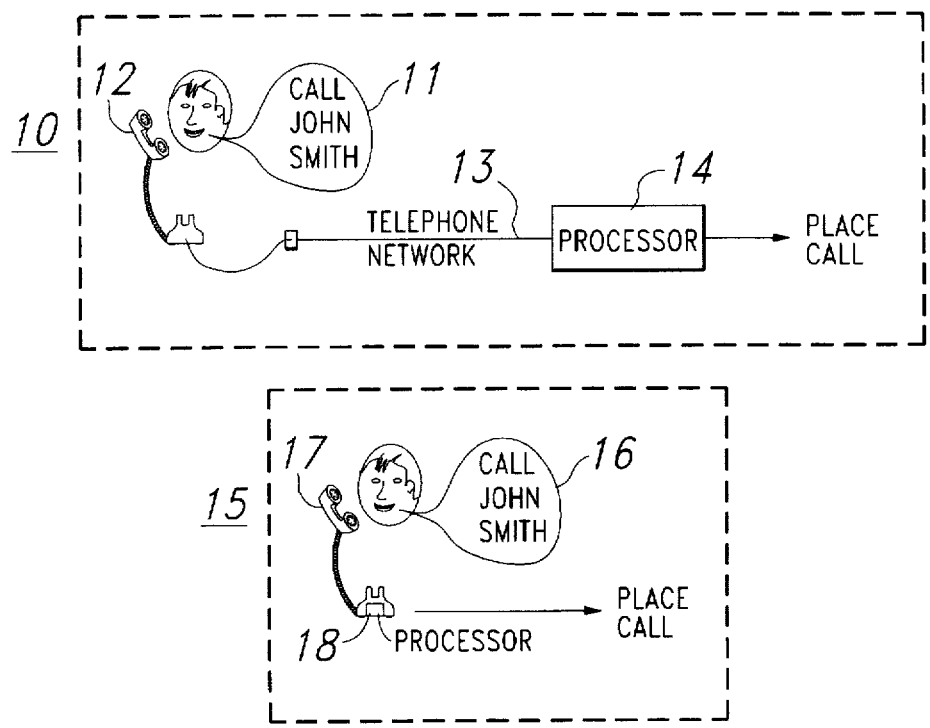
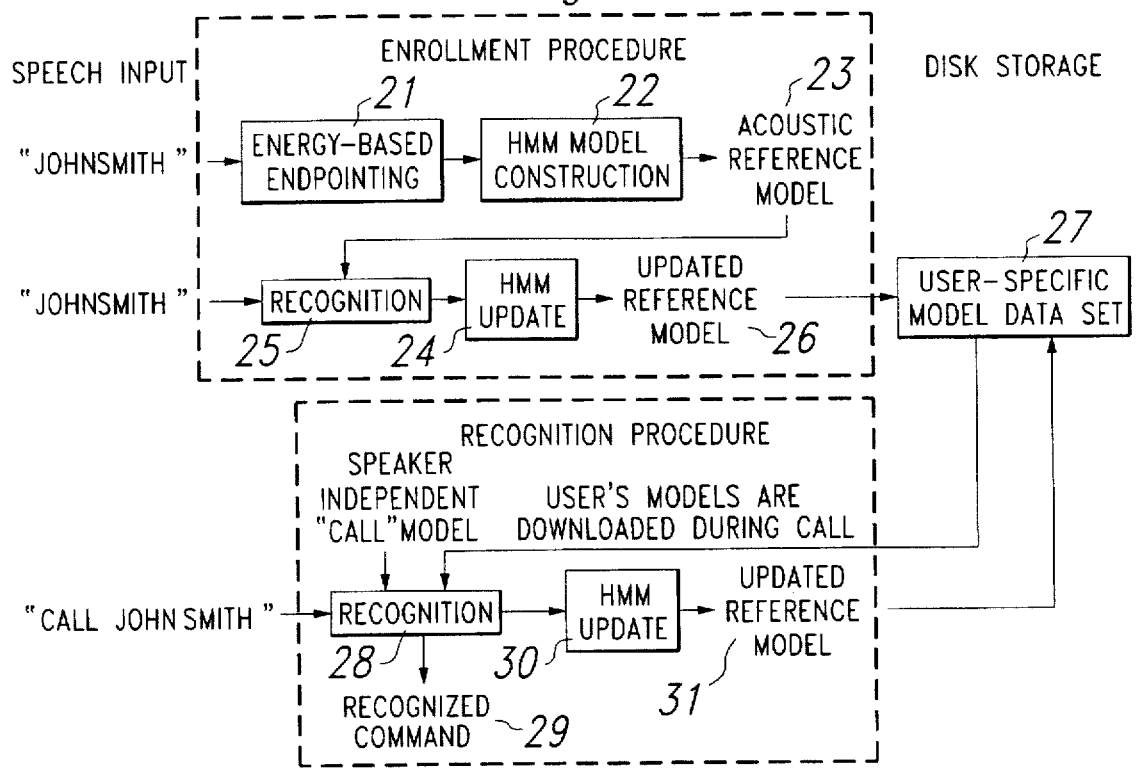
Fig. 1
Fig. 2 PRIOR ART

SPEAKER-DEPENDENT SPEECH RECOGNITION USING SPEAKER INDEPENDENT MODELS

This application is a Continuation of application Ser. No. 08/127,716, filed Sep. 27, 1993, now abandoned.

TECHNICAL FIELD OF THE INVENTION

This invention relates to speech recognition, and more particularly to speaker-dependent speech recognition using speaker independent models.

BACKGROUND OF THE INVENTION

In the telecommunications marketplace, there is a growing demand for user-customizable features relying on speech technology. A primary example is voice-based speed dialing, or the capability to place a telephone call simply by saying the name of the person to be called, where that name and its associated number have been previously stored, based on input from the user.

FIG. 1 illustrates this capability using two alternative configurations. In the first configuration 10, a user can speak a word or phrase including a user-selected name or expression 11 into a telephone handset 12. This signal is transmitted through the telephone network 13 to a processor 14. The processor 14 recognizes the spoken phrase, looks up the recognized phrase in a previously created table containing the corresponding telephone number, and places a call to the selected telephone number.

In an alternative configuration 15, the user speaks a word or phrase 16 into a telephone handset 17 which is coupled to a processor 18. The processor 18 recognizes the spoken phrase, looks up the recognized phrase in a previously created table containing the corresponding telephone number, and places a call to the selected telephone number. In this case, the spoken command is processed locally rather than transmitted over telephone channels to the processor. An example use of this configuration is in cellular telephone systems.

The technology required to support speed dialing applications, as shown in FIG. 1, can also provide the capability for user-customizable voice commands for other telecommunications functions and for applications involving other systems such as user control of computer workstations or handheld devices.

An enabling technology for these applications is text independent speaker dependent speech recognition. This technology allows users to train a system to recognize user-selected words and phrases by saying each word or phrase one or more times during an enrollment interaction with the system.

FIG. 2 illustrates a prior art method for text independent speaker dependent speech recognition for speed dialing.

To add a name, a user says the name during an enrollment interaction with the system as illustrated in FIG. 2. The input signal is analyzed to locate the end points of the speech in the input signal. FIG. 2 shows energy based end-pointing 21. Other end-pointing techniques are possible, such as recognition-based end-pointing or null-scoring end-pointing as taught in U.S. Pat. No. 5,222,190, issued Jun. 22, 1993 to Pawate et al., entitled Apparatus and Method for Identifying a Speech Pattern. The signal is then input to the model construction module 22. The model construction module constructs a model corresponding to the segment of the input signal between the end points found in 21. The output of this module is a speaker-dependent acoustic reference model 23. In a common implementation, this model is a Hidden Markov Modeling (HMM).

If the enrollment process does not include updating the initial model, then the model 23 is stored in a database record 27 associated with this user. More commonly, the enrollment process also requires one or more update operations 24. The user is required to repeat the name one or more times. For each such repetition of the name, the signal containing the spoken name is aligned with the model 23 using a speech recognition algorithm 25. The acoustics parameters of the model are updated by averaging the model parameters with the corresponding parameters of the input speech in accordance with the alignment found by the speech recognition algorithm. The result of averaging model parameters is an updated reference model 26. The updated reference model 26 is stored in a database record 27 associated with this user.

Each time an enrolled user accesses the speed-dial system, the acoustic reference models for that user are retrieved from the database storage 27 and downloaded to the speech processing system. When the user utters a calling command, the speech input is compared with the downloaded models to perform recognition using a speech recognition algorithm 28. In addition to speaker dependent models, the recognition system may include some speaker independent models for predefined vocabulary items. For example, recognition of "Call John Smith" may involve a speaker independent model for "call" and a speaker dependent model or models for "John Smith".

The recognizer outputs the recognized command 29 such as "Call John Smith". It may also produce a detailed alignment of the input utterance with the recognized model. The detailed alignment is used to update the model 30 as in the update process 24 performed during the alignment interaction. Such alignment may be conditional on a favorable response by the caller to the recognition results. For example, in the speed dialing application, the system 25 may update the model only if the user does not cancel the call after being notified of which name was recognized. If the model is updated, the updated model 31 must be stored in the model database 27.

This method requires data storage for speaker dependent models and sufficient bandwidth to rapidly download the models for each user from the database as they are required during an interaction and to upload them after update. The data storage must be RAM (random-access memory), not ROM (read-only memory). For widespread access to the model database throughout the telephone network, the database must be replicated at different locations, and updates must be propagated to all copies of the database in a timely manner. The size of the models depends on a variety of parameters, but a model may, for example, require 2400 32-bit words of storage per second of speech represented.

U.S. Pat. No. 5,165,095, issued Nov. 17, 1992 to Mark Borcherding, entitled Voice Telephone Dialing, teaches one method to reduce memory and bandwidth requirements by storing only the acoustic model parameters of each HMM, using a uniform transition network and transition probabilities for all models. This eliminates the need to store and transmit the transition network and probabilities for each model. However, the transition network and probabilities typically constitute only a small fraction of the total data storage requirements for an HMM, on the order of 10% or less.

SUMMARY OF THE INVENTION

Method and apparatus for providing speaker dependent speech recognition of any word or phrase is disclosed that includes storing speaker independent subword models and assigned identifiers and selecting a series of speaker independent subword models dependent upon speech input and associating a label thereto. The assigned identifiers for the series of speaker independent models are stored with the associated label. The label is issued when newly received speech compares to the series of stored subword models.

In the preferred embodiment of the present invention, a voice based speed dialing system is provided by speaker dependent speech recognition using speaker independent models.

These and other features and advantages of the invention will be apparent to those skilled in the art in the following detailed description of a preferred embodiment taking together with accompanying drawings.

DESCRIPTION OF THE DRAWINGS

FIG. 1 is a schematic diagram illustrating an application of the present invention;

FIG. 2 is a functional block diagram of a prior art speaker dependent recognition system;

DETAILED DESCRIPTION OF THE INVENTION

Applicant's invention herein is novel in its representation of speaker-dependent recognition models entirely as speaker-independent acoustic model identifiers, with no speaker specific acoustic data stored. This significantly reduces the memory and data management requirements for speaker-dependent recognition systems and may have other advantages such as reduced handset dependency.

This approach requires a set of speaker-independent recognition models which represent sub-word units, i.e., a unit of speech that is independent of any particular vocabulary. In the exemplary embodiment, the unit of representation is the phone (individual speech sound), although other units such as the syllable or demi-syllable could be used. The models may be context-dependent or context-independent, i.e., they may or may not represent the phonetic context of the unit; the exemplary embodiment uses context-independent phone models. In addition, models representing non-speech sounds (e.g. silence, breath noises) are typically used.

Figure 3:
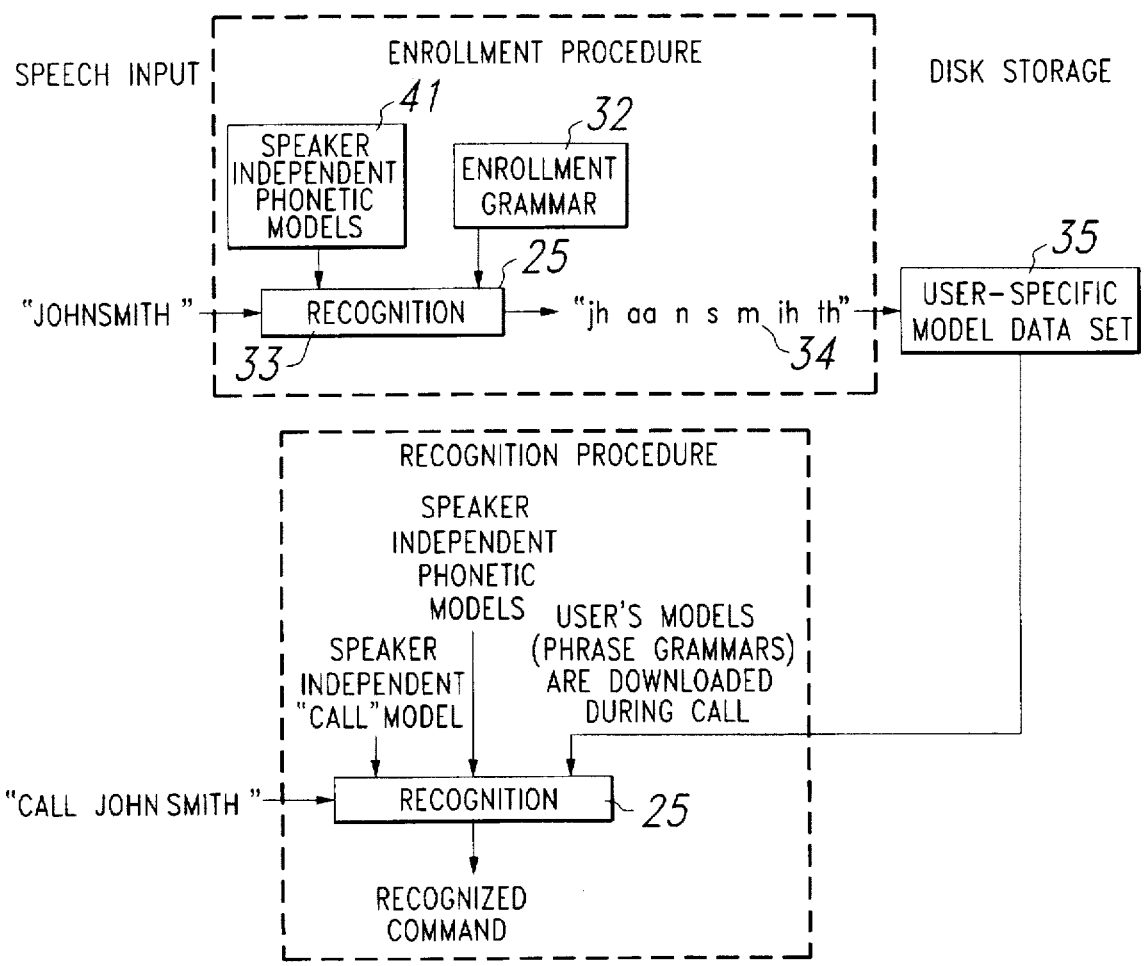
FIG. 3 is a functional block diagram of the present invention.

To add a name, a user says the name one or more times (with the number of times being a system parameter) during an enrollment interaction with the system as illustrated in FIG. 3. Each instance of the name is recognized using speaker-independent (SI) phonetic models from source 41 as the acoustic-level recognition models. A higher-level grammar from source 32 is used during recognition to specify the allowed sequences of acoustic-level models. In the simplest case, a "null" grammar is used, allowing any number of models to occur in any order. Other possibilities include "n-gram" grammars, which specify the allowed sequences of length n, and phonotactically-defined grammars, which specify the allowed sequences in terms of possible sound sequences in the language, such as possible syllables or demi-syllables.

For each instance of the name that is recognized during enrollment, a recognizer 33 outputs the sequence of acoustic-level models 34 used to recognize that name. For example, in the exemplary embodiment, the recognizer outputs labels identifying the phone models and non-speech models (excluding initial and final non-speech) in order as recognized for each input speech signal containing a name instance. This sequence of model identifiers is then stored in a database record 35 associated with this user. If the system requires the user to say the same name more than once during enrollment, so that more than one model identifier sequence is generated for that name, these sequences may be stored separately or combined by collapsing any identical elements in the sequence.

The set of model sequence identifiers generated by this procedure constitutes the speaker-dependent model data that is stored for each user. These sequences can be regarded as "grammars" of each users speed dial names. A distinctive feature of this invention is the fact that the speaker dependent word "grammars" are based entirely on automatic speech recognition of spoken input, so that from the user's point-of-view, the enrollment procedure is the same as with the prior art system shown in FIG. 2. This invention does not require knowledge of the written representation (spelling) of the user-selected words and phrases in order to create models for them. This differs from systems that create recognition models from written representations of words or phrases, such as the method taught by Cohen et al. WO 92/14237.

The database information stored for each model for each user consists of the sequence of acoustic model identifiers. No speaker-dependent acoustic models containing spectral or temporal data are created or stored. In the exemplary embodiment, each one-second model requires an average of 150 bytes of storage using ASCII model identifiers; this can be reduced further by coding model identifiers efficiently. This represents as much as a 98% reduction in storage and data transfer requirements per name relative to a prior art system that creates and stores HMMs for each speed-dial name, depending on the parameters used, and more than a 90% reduction even relative to previously-mentioned (U.S. Pat. No. 5,165,095) Borcherding's more efficient method.

The memory required for the complete system also includes memory for the set of speaker-independent acoustic models (source 41 in FIG. 3). In the exemplary embodiment, this set of models requires a total of about 24,000 32-bit words. This is a fixed requirement for the system; it does not vary with the number of users or number of speed-dial names per user.

Each time an enrolled user accesses the speed-dial system, all name grammars (i.e., acoustic model sequence identifiers) for that user are retrieved from storage 35. When the user says a calling command, the command is recognized using that user's name grammars and the set of speaker-independent acoustic models that were used during enrollment. This same set of speaker-independent models is used for all speakers. The user-specific name grammars constrain the recognition process so that only sequences corresponding to an enrolled name for that user can be recognized.

Figure 4:
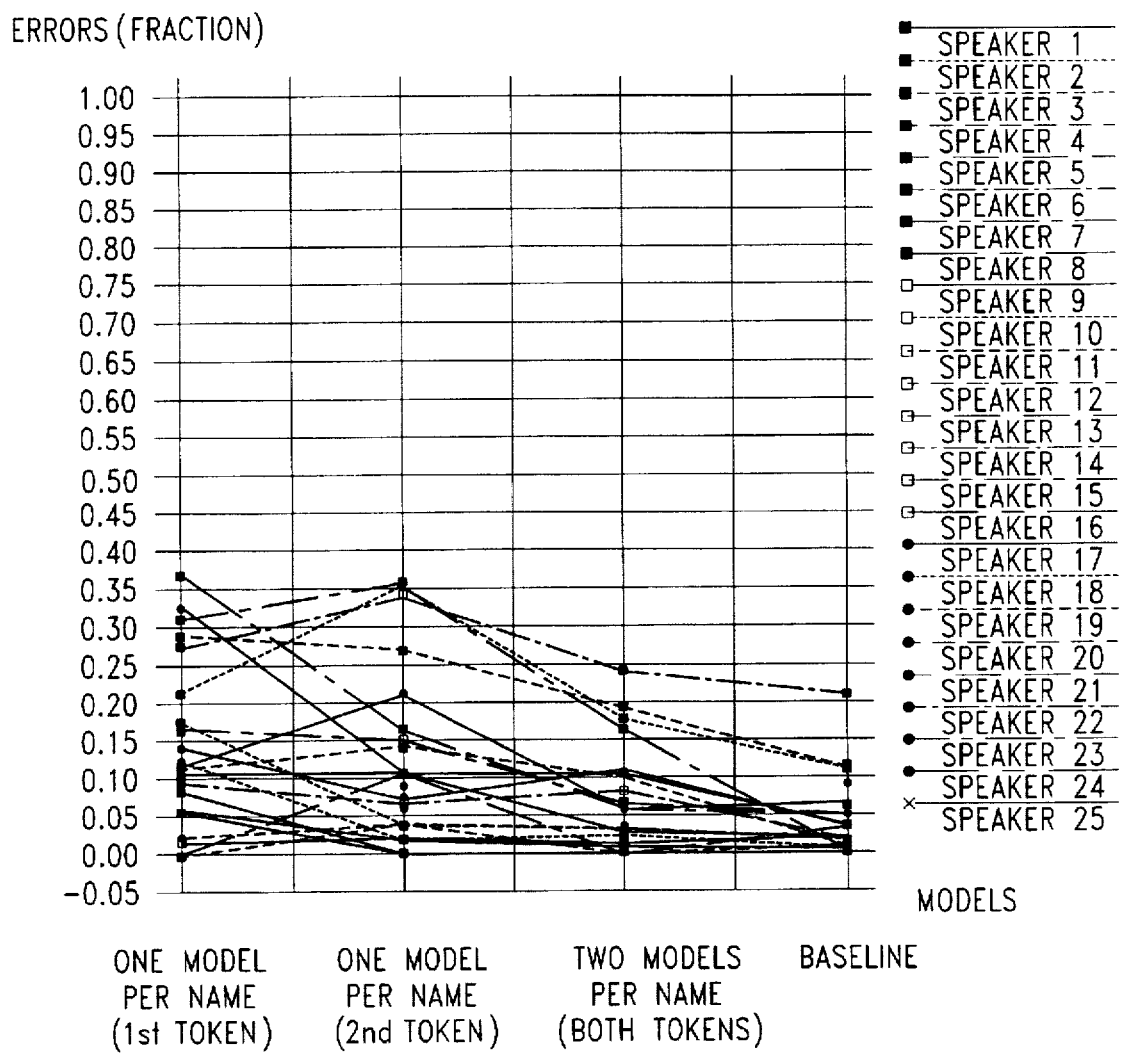
FIGS. 4 and 5 show the results of preliminary recognition tests of the present invention.
Figure 5:
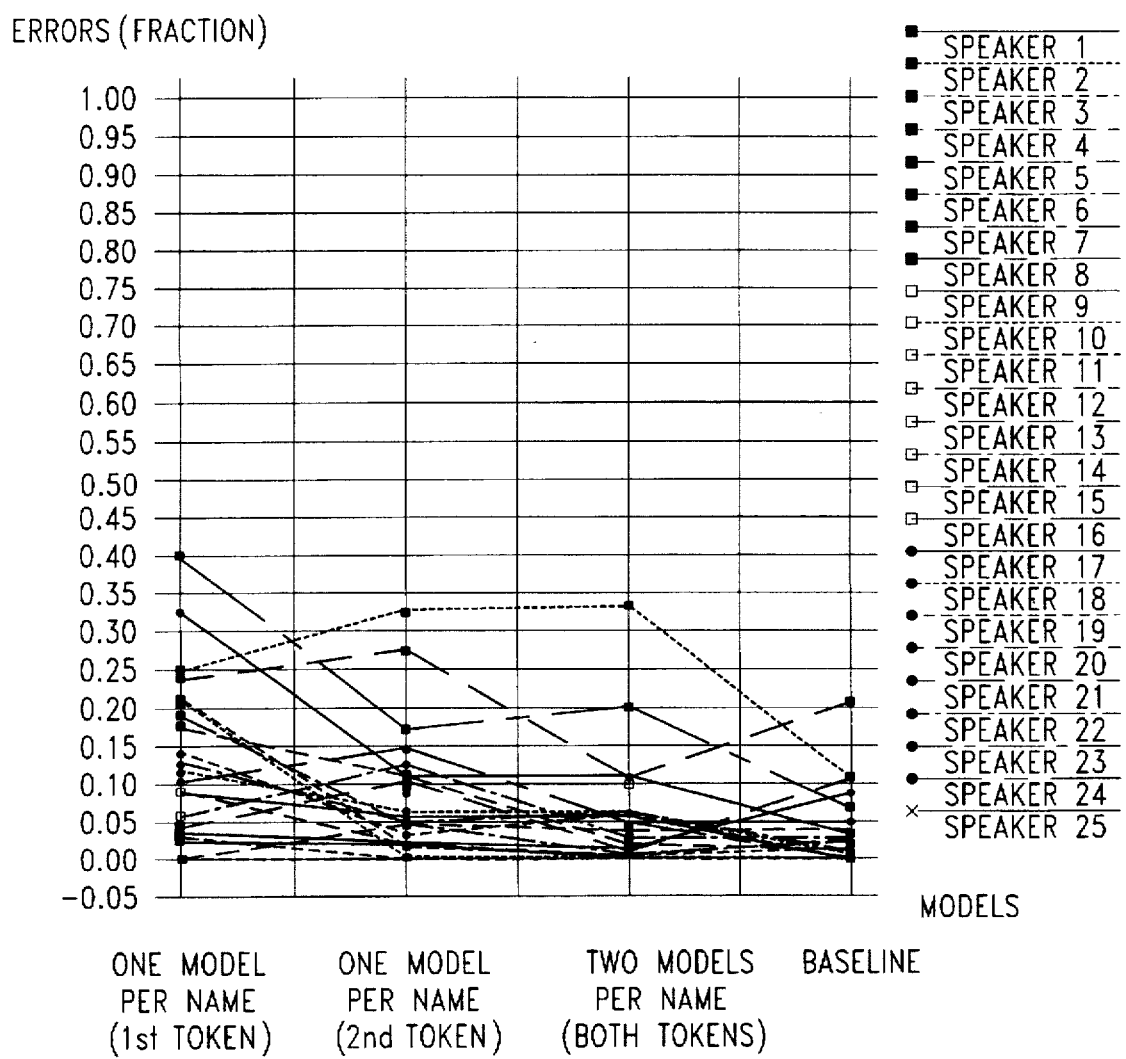

Table 1 below and FIGS. 4 and 5 show the recognition performance obtained in preliminary tests involving 25 speakers. Each speaker enrolled ten names, saying each name twice during enrollment, and tested recognition of those names an average of 85 times. Table 1 shows the average recognition error rate for three methods: (1) the traditional (baseline) approach, i.e., using an acoustic speaker-dependent model for each name, created from one token, updated on to the second token, and updated again after each successful recognition; (2) the novel approach, using a null grammar from enrollment and two models per name, and (3) the novel approach, using a phonotactic grammar for enrollment and two models per name. Averages are shown per speaker (i.e., regardless of number of tests performed) and across speakers (i.e. pooling all tests—in effect weighing scores by number of tests performed).

TABLE 1

| Error Rate (%) | Baseline | Null Grammar | Phonotactic Grammar |
|---|---|---|---|
| Per Speaker | | | |
| Total Errors | 2.92 | 6.25 | 5.49 |
| Substitutions | 2.75 | 5.79 | 5.07 |
| Rejections | 0.17 | 0.46 | 0.42 |
| Across Speakers | | | |
| Total Errors | 2.29 | 5.32 | 3.88 |
| Substitutions | 2.18 | 4.95 | 3.56 |
| Rejections | 0.11 | 0.37 | 0.32 |

Notes:
Null Grammar and Phonotactic Grammar conditions used two models per phase.
Baseline tests used infinite duration models. Phone models are finite duration.

More details on performance in conditions (2) and (3) are shown in FIGS. 4 and 5. These figures show the recognition error rate for four conditions for each speaker. The first three conditions are variations of the speaker-independent acoustic model approach: (1) one model per name, with the model based on the first enrollment token for that name; (2) one model per name, based on the second enrollment token; (3) two models per name, using the models from conditions (1) and (2). The fourth condition shows performance using the traditional approach. (Columns 3 and 4 thus correspond to the averages given in FIG. 2.) FIG. 3 shows performance using the null enrollment grammar, while Table I shows performance for the phonotactic enrollment grammar.

As these figures show, the initial tests with the new method yielded higher error rates than under the old method. However, these preliminary results are quite promising: the error rates are in the vicinity of 5% or less, and the errors were reduced by employing a relatively more restrictive enrollment grammar. These error rates can be reduced further by improving the speaker-independent acoustic models, using a more effective grammar during enrollment, or both.

An additional potential advantage of this approach is that it may improve recognition performance in circumstances where acoustic speaker-dependent models perform relatively poorly because the training data does not adequately represent the acoustics of the input speech. Specifically, when a user's speech has been entirely or almost entirely obtained on one telephone handset, and the user subsequently uses a handset with distinctly different characteristics, recognition performance often degrades because the speaker-dependent acoustic model incorporates characteristics of the initial handset. Handset changes do not pose such a problem for speaker-independent acoustic models because such models are trained on data collected from a variety of handsets.

This approach also simplifies processing and data management requirements in that recognition models are not routinely updated following enrollment. With speaker-dependent acoustic models, the acoustic data is typically updated after each successful recognition in order to improve recognition accuracy and minimize handset dependencies in the models. This type of update is not possible with the speaker-independent acoustic model approach, but also is less necessary, assuming that the initial speaker-independent models were trained on a representative speech database. This reduces processing requirements by eliminating the acoustic update procedure and the need to update the model database on each call. Updates may be performed at intervals, if necessary, by repeating the initial enrollment procedure on spoken input data, whether with or without the user's awareness.

This invention can provide significant benefit to the telephone companies by greatly simplifying the task of providing network-based speaker-dependent speech recognition services for the telephone network. The biggest problem posed when speaker-dependent acoustic models are used is the sheer volume of data traffic involved in transporting those models. This volume presents a significant problem because of the need for near real time access to the data in order to meet customer expectations. As an example, consider the provisioning of a voice-driven speed dial list of 30 names, with each name averaging 2 second in length. If the recognition uses speaker-dependent acoustic models, the network must transport 4,608,000 bits of data to the speech recognizer handling that customer. This is 30 phrases, 2 second/phrase, 4800 words/second, and 16 bits/word. If the recognition uses speaker-independent acoustic models as proposed in this invention, the network, must deliver 72,000 bits of data to the recognizer. As discussed earlier, even this load can be reduced if efficient coding schemes are utilized. This substantially reduces the network data transfer required for call set-up.

Another advantage is that since the need for acoustic model updates is eliminated or greatly reduced, the recognition data can be stored either in a centralized or a distributed manner depending on the business needs of the telephone company. When speaker-dependent acoustic models are used, the data normally must be kept in a centralized store in order to minimize the database update problem.

In addition to the speed calling application described here, this approach is beneficial for any other application requiring speaker-dependent recognition where the number of speakers and/or the number of items per speaker is large enough so that less memory is required using speaker-independent acoustic models than using separate acoustic models for each speaker-dependent model.

Furthermore, it may be useful for any application where speaker-independent data may be stored in ROM, while speaker-dependent data must be stored in RAM. In this case, the approach may be preferable even if there in no reduction in total memory required, because it reduces the RAM portion. An example of such an application is spoken speed dialing of cellular telephones.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A method of providing speech recognition of any word or phrase comprising the steps of:

storing speaker-independent subword models and assigned identifiers for said models wherein Said identifiers are non-acoustic data pointers to said models;

receiving speech input;

recognizing said speech input as a series of occurrences of speaker-independent subword models and associating a label with a series of identifiers corresponding to the series of speaker-independent subword models recognized;

storing said label and said series of identifiers which represent the word or phrase, whereby said label and said series of identifiers are used to recognize the word or phrase; and outputting said label recognized when input speech compares with speaker-independent subword model series defined by said series of identifiers.

2. The method of claim 1 wherein said label represents a command word or phrase.

3. The method of claim 1 wherein said label represents a name word or phrase.

4. The method of claim 1, including an initial step of storing constraints on said series of occurrences of speaker-independent subword models that can be recognized based on language constraints, and said recognizing step of input speech is restricted to recognize the series of subword models limited by the constraints.

5. The method of claim 1, wherein said recognizing step is repeated for each of multiple repetitions of the same input speech word or phrase corresponding to a single label, and the series of identifiers resulting from recognition is stored for each of said multiple repetitions of input speech with the common label.

6. The method of claim 5 further including the step of combining the multiple series of identifiers corresponding to the multiple recognition results into a single series of identifiers based on similarity of series of identifiers.

7. An apparatus for providing speech recognition of any word or phrase comprising in combination:

a storage for storing speaker-independent subword models and assigning identifiers for said models wherein said identifiers are non-acoustic data pointers to said models;

a receiver for receiving speech input;

a first recognizer coupled to said storage and said receiver and responsive to said speech input and said speaker-independent subword models for recognizing said input speech as a series of occurrences of speaker-independent subword models and associating a label with a series of identifiers corresponding to said series of speaker-independent subword models recognized; and means coupled to said recognizer for storing said label and said series of identifiers which represent said word or phrase.

8. The apparatus of claim 7 including a second recognizer coupled to said means for storing and responsive to said input speech for outputting said label when said input speech compares with said series of identifiers which represent said speaker-independent word or phrase.

9. The apparatus of claim 8, including the initial steps of means for storing constraints on said series of occurrences of speaker-independent subword models that can be recognized based on language constraints, and said second recognizer is restricted to recognize said series of subword models limited by said language constraints.

10. The apparatus of claim 7 wherein said first recognizer repeatedly recognizes each multiple repetitions of the same input speech word or phrase corresponding to a single label and the series of identifiers resulting from the recognition is stored for each of said multiple repetitions of input speech with the common label in said means for storing.

11. The apparatus of claim 10 including means for combining said multiple series of identifiers corresponding to the multiple recognition results into a single series of identifiers based on similarity of said series of identifiers.

* * * * *